United States Patent [19]
Ness

[11] Patent Number: 5,261,824
[45] Date of Patent: Nov. 16, 1993

[54] SALES PROMOTION VEHICLE FOR DEMONSTRATING MOBILE ELECTRONIC ACCESSORIES

[76] Inventor: Allan H. Ness, 60 Ridge Rd., Westminster, Md. 21157

[21] Appl. No.: 819,816

[22] Filed: Jan. 13, 1992

[51] Int. Cl.$^5$ ............................................. G09B 25/00
[52] U.S. Cl. .................................. 434/365; 434/219; 434/379; 280/47.35; D34/12
[58] Field of Search ................ 434/37 P, 62, 66, 219, 434/224, 365, 373; 280/47.34, 47.35; D34/12

[56] References Cited

U.S. PATENT DOCUMENTS

| | | | |
|---|---|---|---|
| 3,874,531 | 4/1975 | Mayo | 280/47.35 X |
| 4,650,425 | 3/1987 | McGarry | 434/219 |
| 4,755,881 | 7/1988 | Bartlett | 358/252 X |
| 4,989,291 | 2/1991 | Parent | 280/47.35 X |
| 5,009,067 | 4/1991 | Bonnell | 434/219 X |
| 5,161,535 | 11/1992 | Short et al. | 128/660.01 |

Primary Examiner—Richard J. Apley
Assistant Examiner—Joe H. Cheng
Attorney, Agent, or Firm—Eugene F. Osborne, Sr.

[57] ABSTRACT

A portable sales promotion apparatus for electronic systems comprises electronic control modules and electronic output devices that are transported from the retailer's supply storeroom to the outside site of the customer's parked mobile vehicle where they are placed in the passenger area of the: vehicle for demonstrations of system performance, for experimental determination of any modifications required of the vehicle for installation of the system, and for the subjective evaluation of the customer or occupant of the vehicle prior to execution of a contract for purchase of a system to be installed. The demonstration vehicle, operable by the salesperson, is a roll-about cabinet that houses supporting electronic modules of the systems being demonstrated, an independent power supply, and control accessories subject to operation by the salesperson for conductiong the demonstrations.

17 Claims, 4 Drawing Sheets

SALES PROMOTION VEHICLE FOR DEMONSTRATING MOBILE ELECTRONIC ACCESSORIES

BACKGROUND OF THE INVENTION

1. Field of the Invention

This invention, in the preferred embodiment, relates to demonstration equipment for subjective consumer evaluation of electronic accessories placed in the environment of the comsumer's own mobile transportation vehicle.

2. Related Art

Retailers of electronic accessories frequently provide for demonstration and customer evaluation of their products in special observation and listening booths or rooms wherein the customer may make subjective judgments among competing product lines. Installation in the customer's vehicle for demonstration is at the risk of damage to the vehicle in the event dissatisfaction requires removal of the promoted product lines.

SUMMARY OF THE INVENTION

The present invention comprises electrical components in and upon a cabinet which is, in turn, mounted upon a movable platform that has portability features similar to a hand truck. The framed unit, or cabinet, houses AC-DC power converters, switching devices, interconnecting cables, and cooling fan. The cabinet has inside storage space for transporting the consumer's interface electronic components from the retailer's stock supply area to a nearby parking location of the customer's vehicle. These interface components comprise handsets, tuners, speakers, and display units. Side panels of the cabinet have mounting facilities and surfaces for bulkier transmitting or receiving modules, power amplifiers, distribution blocks and terminating components. The configuration of the loaded mobile evaluation unit permits passage through common doorways of buildings. For mobility of the evaluation unit four wheels are provided; two large wheels on an axle beneath the rear of the platform and two 360-degree rotatable smaller caster wheels beneath the front of the platform. The requirement for dc power is provided by the fixed internal converter which is in lieu of heavy storage batteries. A power supply cord is extendable to a nearby 110-volt AC source receptacle. The converter typically provides 12-volt DC as do most motor vehicles; however, other voltages such as 6 and 24 volts can be supplied.

One objective of the present invention is to permit the electronics retailer to demonstrate his products within the specific and unique environment of potential purchaser's vehicles which have diverse characteristics.

Another objective of this invention is to permit potential purchasers to make comparative subjective evaluations of competing electronic products in accord with their personal preferences as to types of programs and quality of audio or video reproduction.

Another objective of this invention is to demonstrate electronic products for the purchaser's evaluation and satisfaction prior to actual installation in the purchaser's vehicle and thereby avoid potential damage to the physical or electrical integrity of the vehicle.

Another objective of this invention is to save time and reduce confusion among both retail sales people and potential purchasers in demonstration, evaluation, and commitments to purchase chosen products.

Another objective of this invention is to establish specific locations in the purchasers's vehicle for placement of audio speakers, visual display units, and tuners suitable to the preference of the purchaser.

Another objective of this invention is to enhance sales at retail shops relative to catalog order sources of electronic products.

Another objective of the invention is to increase sales of electronic products by "hands on" evaluations made by purchasers within the environment of their own vehicles.

Still another objective of this invention is to save floor space at the retailer's shop by eliminating the needs for demonstration booths or rooms for customer's use.

Other objects, features, and advantages will become apparent from the description in connection with the accompanying drawings of the presently preferred embodiment of the invention.

BRIEF DESCRIPTION OF THE DRAWINGS

The invention is described with reference to accompanying drawings, in which.

DETAILED DESCRIPTION

Figure 1:
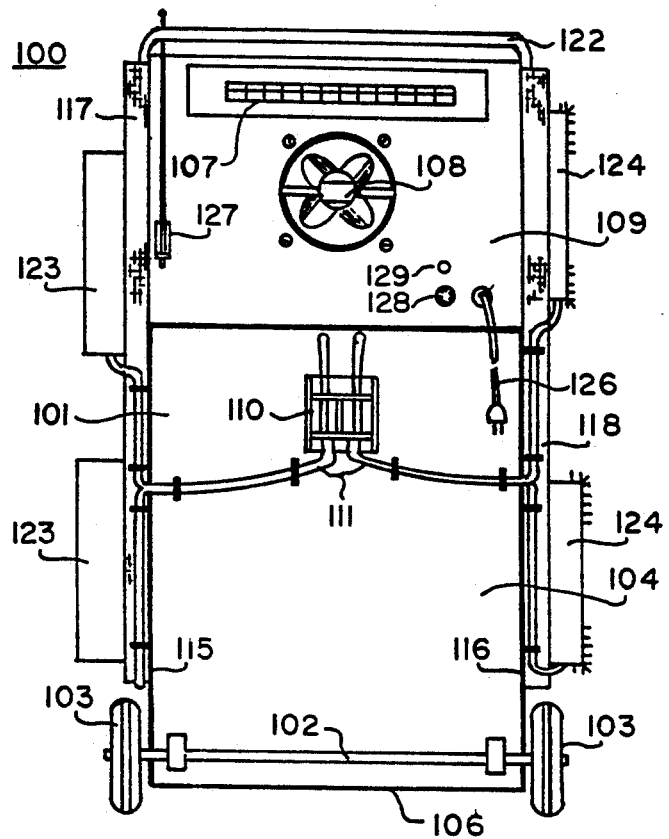
FIG. 1 is an elevation view of the operational side of my demonstration vehicle.
Figure 2:
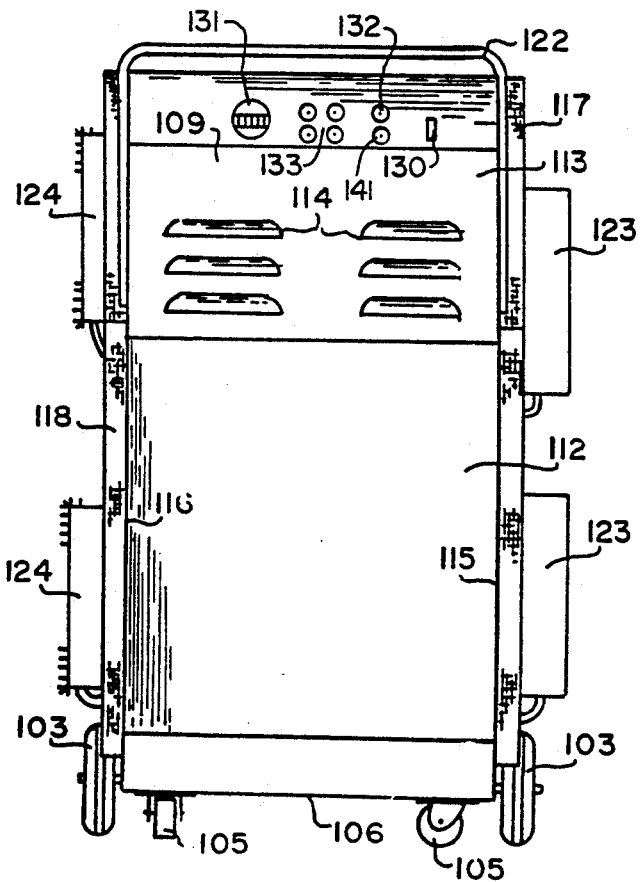
FIG. 2 is an elevation view from the rear of the vehicle.
Figure 3:
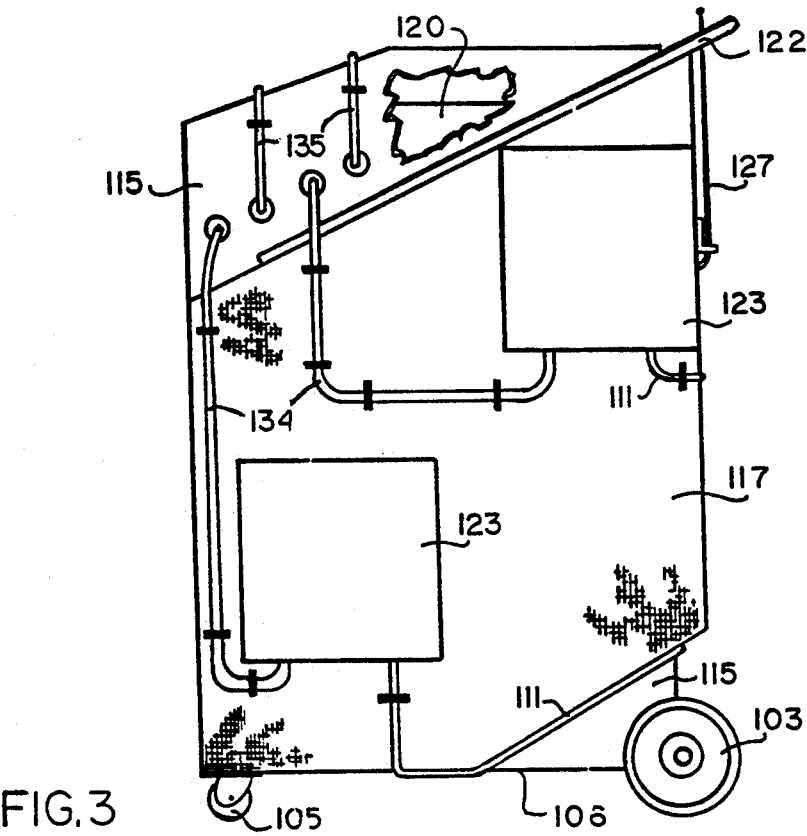
FIG. 3 is an elevation view of the left side of the vehicle which is a mirror image of the right side of the vehicle.

Beginning with reference to FIGS. 1-3 my demonstration vehicle 100 is an upright elongated cabinet 101 supported by a transverse axle 102 and a pair of rubber-clad wheels 103 attached to the base of the operator's facing panel 104, and further supported by a pair of swiveling caster wheels 105 that are attached near opposing corners of the cabinet base 106 opposite to the transverse axle 102. The wheels 103 and the casters 105 provide portability for movement of the demonstration vehicle 100 by the salesperson from stockrooms, etc., to an outside location of the prospective purchaser's parked mobile vehicle for comparative demonstration, in situ, of electronic accessories such as audio, video, and communication equipment and systems.

The operator's facing panel 104 is fitted with, FIG. 1, a switching subpanel 107, a cooling fan 108 for an enclosed compartment 109 at the top of the cabinet 101, an antenna 127, and a DC power distribution block 110 and attached power wiring harness 111. An input electrical power cord 126 enters the top compartment 109 adjacent to the fuse 128 and a light emitting diode (LED) indicator 129 of available DC power at the switching subpanel 107. At the opposite side, FIG. 2, of the cabinet 101 an open space 112 extends from the cabinet base 106 upward to a short panel 113 having louvers 114 therein for air circulation into the enclosed compartment 109. The open space 112 is used for holding loose accessories normally intended for placement within the client purchaser's cab or passenger compartment as the loaded demonstration vehicle is rolled from the stockroom to the demonstration site. At the top of the short panel 113, a self-illuminating on-off switch 130 indicates the application of AC power through the input power cord 126. A running time meter 131 tallies the hours of usage of the vehicle 100. Antenna output jacks 132 are interfaces for a pair of cables (not shown) extending from the demonstration vehicle 100 to the customer's passenger compartment for connection to "deck" demonstration modules that are operated by the occupant of the passenger vehicle such as tuning receivers of radios, televisions, and communications sets, for example. Low level signals from the receiving deck modules (not shown), at the customer's vehicle are returned to the input jacks 133 for further amplification and signal processing in the electronic modules 123 and 124 aboard the demonstration vehicle 100.

Figure 4:
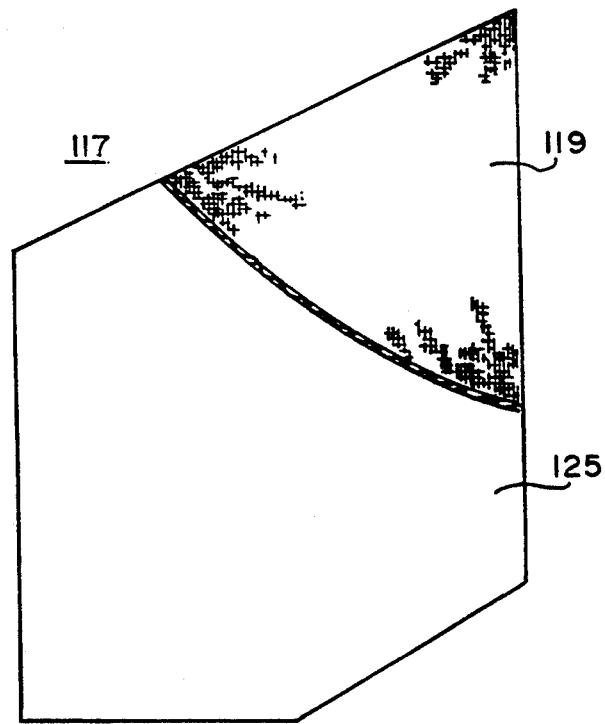
FIG. 4 illustrates the accessory mounting wing panels, right and left, which have mirror image configurations.
Figure 5:
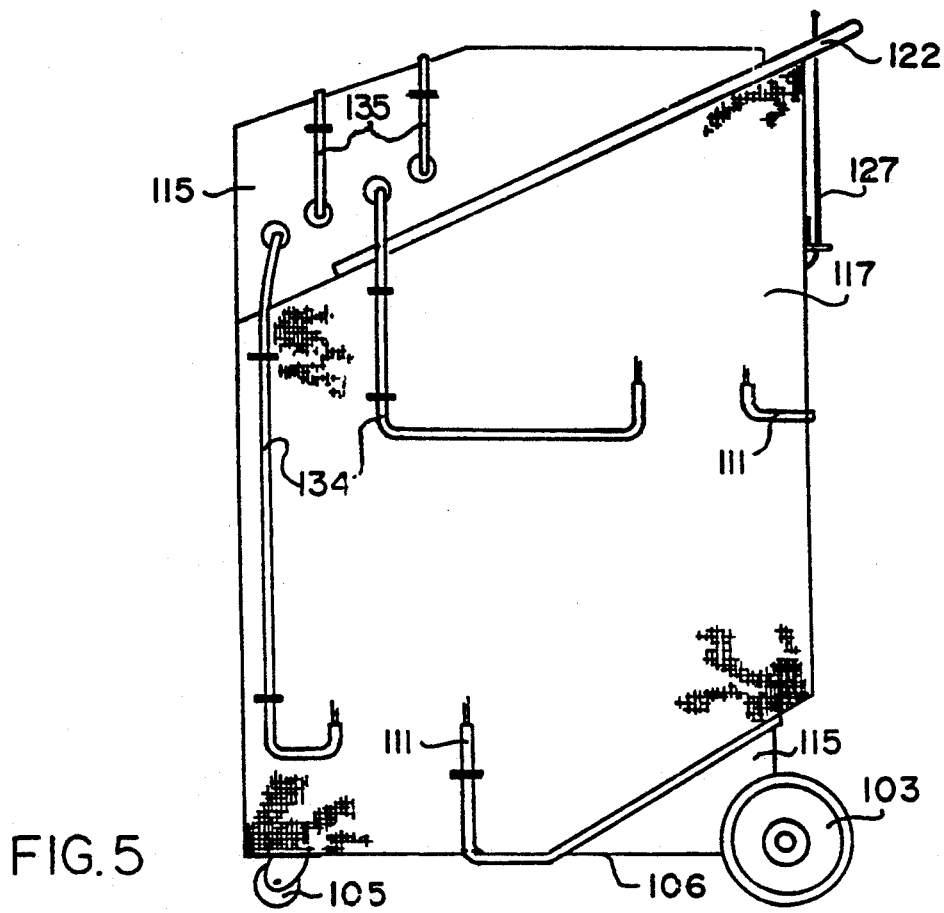
FIG. 5 is an elevation view of the left side of my vehicle shown with accessory electronic modules removed and the view is a mirror image of the right side of my vehicle.

Left and right side panels 115 and 116, respectively, which have mirror image configurations, extend from the base 106 to the top of the cabinet 101. As shown in FIGS. 1-3 and 5 these side panels 115 and 116 each support a mounting wing panel 117, 118, respectively, to which electronic modules 123-124 may be attached for customer demonstrations. The wing panels 117, 118 are of a pervious material 125, such as plywood, with the mounting surfaces covered by cut-pile carpet 119 for receiving typical mechanical fasteners such as machine screws, staples, etc., (FIG. 4). In addition, FIGS. 3 and 5 illustrate signal cables 134 which interconnect the demonstration modules 123 (or 124 on the right side panel 116) to the operator's switching control panel 107. Output driver cables 135 are extendable from the demonstration vehicle 100 to the customer's passenger compartment to deliver the chosen demonstration program in output devices (not shown) which are typically audio speakers, video displays, and electronic printers or such devices in combination.

Figure 6:
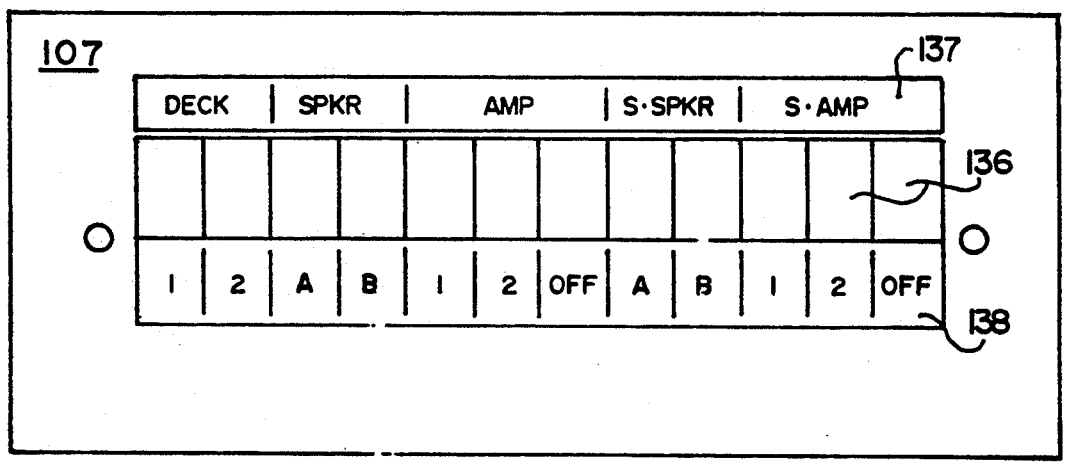
FIG. 6 is an enlarged view of the control switch subpanel.

The enclosed compartment 109 at the top of the cabinet 101 provides space for permanent installation therein of an AC to DC converting electrical power supply 120 which typically converts 110-volt AC to 12-volt DC (nominal) for supply to mobile electronic modular units, FIG. 3. A power supply cord 126 is extendable to a nearby AC receptacle. The compartment 109 also contains the operator's switching control subassembly 107. A multiplicity of switches 136, FIG. 6, allows the sales person to make selections during the demonstrations to customers of alternative electronic modular components to obtain by in situ performance evaluation the electronic system most satisfying to the personal tastes of the customer. Selected switch function cards are inserted in the card holder 137 for the convenience of the sales operator of the vehicle 100. Switch identifications 138 are inscribed on the subpanel 107 beneath the respective switches 136. For the illustrations shown in FIG. 6, DECK represents alternate radio receiver-casette player preamplifiers; SPKR represents alternate front and rear speaker combinations; AMP represents alternate high power amplifiers; S-SPKR represents alternate secondary speakers; and S-AMP represents alternate driving power amplifiers for the secondary speakers. For demonstration of video or telecommunications equipment these designation cards 137 are appropriately changed.

Figure 7:
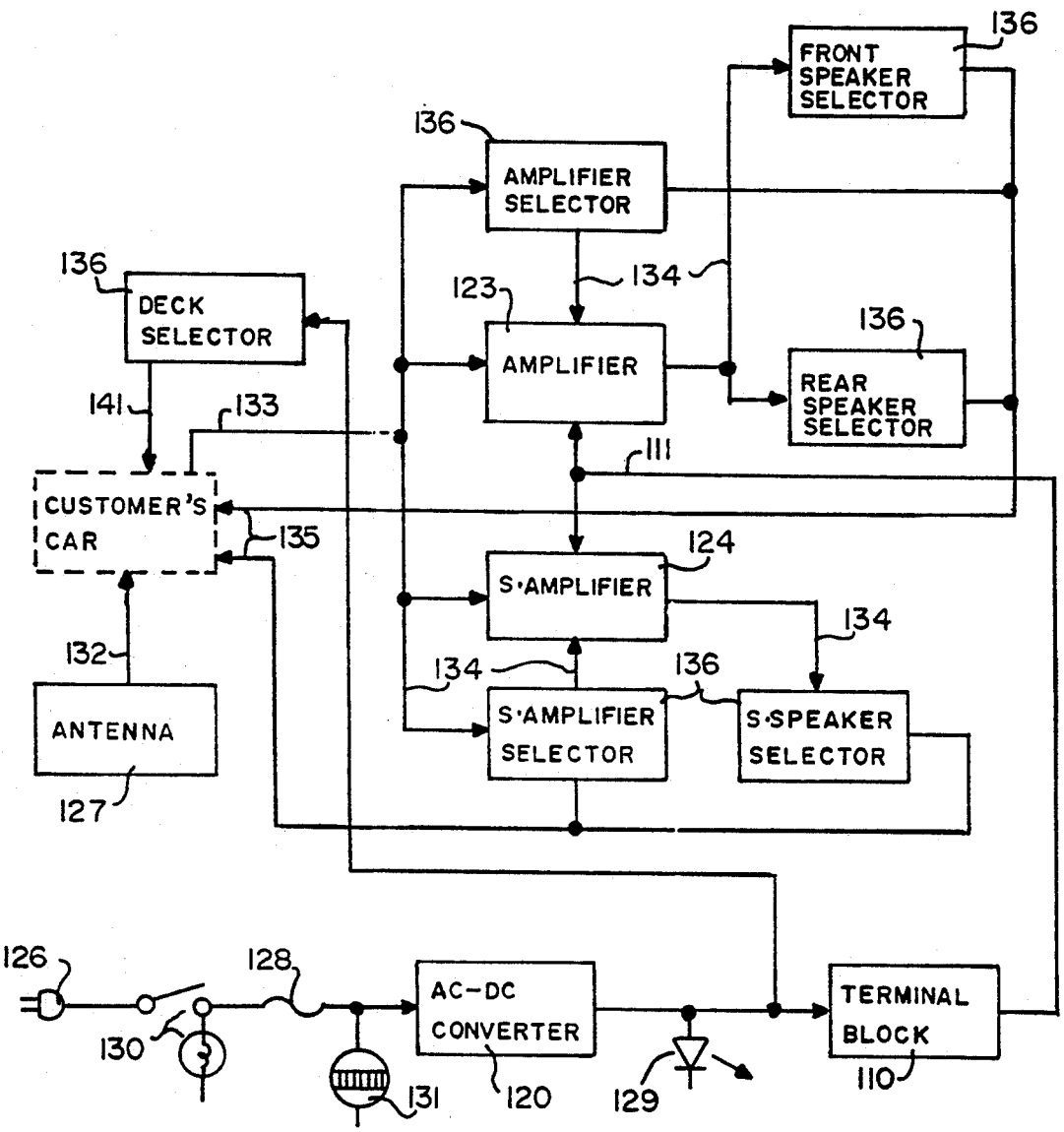
FIG. 7 is a block diagram of the electrical subsystem of my demonstration vehicle.

A block diagram, FIG. 7, for the electrical interconnection of the components of my demonstration vehicle 100 illustrates the antenna, power distribution, and switching selector panel subsystems. Complete demonstration of mobile electronic systems can be made without breaking into the electrical wiring of the customer's vehicle, be it an automobile, boat, or aircraft. Cutting into the physical structures of the customer's vehicle is not required for demonstration of mobile electronic systems. Signals from the antenna subsystem 127 are transmitted by cables (not shown) extending from jacks 132 to DECK modules placed in the customer's vehicle. In my preferred model DC power for the demonstration is supplied by the AC-DC converter 120, having an AC input via cable 126, a self-illuminating on-off switch 130, a protective fuse 128, and a running time meter 131. DC power is supplied to the remote DECK modules via cables 141 and to the local amplifiers and processors 123, 124 via the power terminal block 110 and cables 111. An LED indicator 129 confirms the status of DC power. Signals selected by the customer's tuning of DECK modules return via cables 133 to the switches 136 of the control subpanel 107. The selected DECK channel signal is applied selectively by switches 136 to the main and secondary amplifier 123, 124 via cables 134 for further selection for demonstration in the customer's vehicle via cables 135 through front, rear or secondary speakers. For demonstration of video or telecommunication systems appropriate display or output devices would substitute for the speakers.

Figure 8:
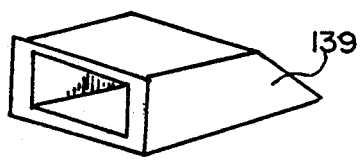
FIG. 8 represents a typical enclosure for a deck module for temporary placement in a customer's passenger compartment.
Figure 9:
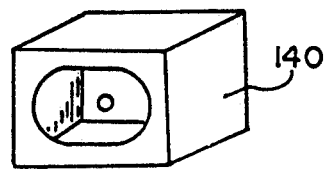
FIG. 9 represents a typical enclosure for an output module for temporary placement in a customer's passenger compartment.

Appropriate portable enclosures, FIGS. 8 and 9, are provided for DECK modules, 139, and for output modules (SPEAKERS), 140, for placement in the customer's vehicle to insure his safety and convenience during the demonstration evaluations.

Controlled roll-about of the demonstration vehicle 100 is by means of the operator's handle bar 122 which extends across the facing panel 104 for attachment near the upper extremities of the left and right side panels 115, 116, FIGS. 1-3, 5.

This specification of a preferred embodiment of my invention is illustrative and it should be recognized that design options and modifications may be made without departure from the invention.

Having described my invention, I claim:

1. A portable sales promotion apparatus, operable for in situ comparative demonstrations of competitive electronic systems within a potential customer's mobile vehicle, wherein said portable sales promotion apparatus comprises:

a) a first modular deck selector for control of a first electronic system in response to operation by an occupant from within a passenger area of said customer's mobile vehicle;

b) a second modular deck selector for control of a second competing electronic system in response to contemporary operation by said occupant from within said customer's mobile vehicle passenger area;

c) at least one first competing electronic output device for delivery of information of interest and value to said occupant from said first electronic system, said first electronic output devices having been temporarily placed at preferred locations within said customer's mobile vehicle passenger area;

d) at least one second competing electronic output device for delivery of information of equivalent interest and value to said occupant from said competing second electronic system, said second competing electronic output devices having been temporarily placed at said preferred locations within said customer's mobile vehicle passenger area for comparative evaluation;

e) an electrical power supply for activating and operating said competitive electronic systems during said in situ demonstrations independently of any electrical power system of said customer's mobile vehicle.

f) a demonstration vehicle for use by an attending salesperson for transporting said competitive electronic systems, from a stockroom of supplies maintained for sales, to an outside parking place of said customer's vehicle and for said comparative demonstrations of said competitive electronic systems;

g) means for supplying said demonstration vehicle with a source of energy for said independent electrical power supply; and h) means, operable during said in situ demonstrations, for demonstrating the comparative performances of said competitive electronic systems.

2. A portable sales promotion apparatus, as recited in claim 1, wherein said demonstration vehicle comprises:

a) a cabinet comprising:

an open space for temporary holding of said first and second deck selectors and said first and second output devices of said competing first and second electronic systems during transit of said vehicle to said outside parking place where said deck selectors and said output devices are placed in preferred locations within said customer's vehicle;

an enclosed compartment for installation therein of permanent electrical subsystems required for demonstrations of said competing electronic systems; and means for roll-about portability of said cabinet, responsive to said attending salesperson;

b) at least one panel affixed to said cabinet for mounting thereon modular subsystems of said competing electronic systems during the interval of said demonstrations;

c) a switching subsystem permanently installed for selection between said competing electronic systems for demonstration of performance and for design of an electronic system to satisfy the customer's preferences, said switching subsystem responsive to said attending salesperson; and d) a wiring harness for interconnection of said power supply, said switching subsystem, and said competing electronic systems.

3. A portable sales promotion apparatus, as recited in claim 2, further comprising:

a) a means for regulating the internal temperature of said enclosed compartment.

4. A portable sales promotion apparatus, as recited in claim 3, wherein said means for regulating said enclosed compartment internal temperature comprises:

a) louvers in at least one panel wall of said enclosed compartment for the intake of ambient air; and b) an exhaust fan for discharge of interior air from said enclosed compartment.

5. A demonstration vehicle, as recited in claim 2, wherein said module mounting panel comprises:

a) a board of pervious material having a planar surface area for receiving mechanical fasteners for holding said second set of electronic modules thereto; and b) a covering of cut-pile carpet bonded to said planar surface area.

6. A portable sales promotion apparatus, as recited in claim 1, wherein said electrical power supply comprises:

a) a converter of 110-volt AC power to a 12-volt DC supply.

7. A portable sales promotion apparatus, as recited in claim 1, wherein said means for supplying said demonstration vehicle with a source of energy for said independent electrical power supply comprises:

a) an electrical cable for connecting said demonstration vehicle to a nearby off-vehicle source of 110-volt AC electrical power.

8. A portable sales promotion apparatus as recited in claim 2, wherein said switching subsystem, responsive to said attending salesperson, comprises:

a) a first set of at least two switches for selective activation of said first and second module deck selectors;

b) a second set of at least two switches for selective activation of competing amplifier modules;

c) a third set of at least two switches for selective activation of said first and said second competing output devices;

d) a fourth set of at least two switches for selective activation of competing secondary power amplifier modules; and e) a fifth set of at least two switches for selective activation of competing secondary output devices.

9. A portable sales promotion apparatus, operable for in situ demonstrations of an electronic system within a potential customer's mobile vehicle, wherein said portable sales promotion apparatus comprises:

a) a modular deck selector for control of said electronic system from a temporary location within said customer's mobile vehicle, said deck selector responsive to manual operation by an occupant of said customer's mobile vehicle for establishing an operating mode of said electronic system;

b) at least one electronic output device for delivery of information of interest and value to said occupant from said electronic system, said electronic output device having been temporarily placed at at least one location within said customer's vehicle during said in situ demonstration of said electronic system;

c) an electrical power supply for activating and operating said electronic system during said in situ demonstration independently of any electric power system of said customer's mobile vehicle;

d) a demonstration vehicle for use by an attending salesperson for transporting said electronic system, from a stockroom of supplies maintained for sales, to an outside parking place of said customer's mobile vehicle and for said demonstration of said electronic system;

e) means for supplying said demonstration vehicle with a source of energy for said independent electrical power supply;

f) means, operable during said in situ demonstrations, for demonstrating performance of said electronic system for the satisfaction of said customer's personal preferences;

g) means, operable during said in situ demonstrations, for establishing locations for the custom installation of the components of said electronic system in said customer's mobile vehicle that are acceptable to said customer; and h) means, operable during said in situ demonstrations, for determining essential modifications of said customer's vehicle prior to the execution of a purchase contract for a permanent installation of said electronic system in said customer's mobile vehicle.

10. A portable sales promotion apparatus, as recited in claim 9, wherein said electronic system comprises:
a) an audio information and entertainment system.

11. A portable sales promotion apparatus, as recited in claim 9, wherein said electronic system comprises:
a) a video information and entertainment system.

12. A portable sales promotion apparatus, as recited in claim 9, wherein said electronic system comprises:
a) a communications system.

13. A portable demonstration apparatus for the experimental specification of design modifications of a mobile passenger vehicle for the custom installation of an electronic system to supply information of interest and value to passengers of said mobile vehicle, wherein said demonstration apparatus comprises:

a) a deck selector for experimental control of said electronic system from temporary locations within said passenger vehicle in response to operation by an occupant of said passenger vehicle;

b) at least one electronic output device for delivery of said information from said electronic system, said electronic output device having been temporarily placed at alternative locations in said passenger vehicle for experimental evaluation of the performance of said electronic system;

c) an electrical power supply for activating and operating said electronic system during said experimental performance evaluations, said electrical power supply operable independently of any electrical power system of said passenger vehicle;

d) a demonstration vehicle for transporting said electronic system from a stockroom of supplies to an outside parking place of said passenger vehicle for said experimental performance evaluations;

e) means for supplying said demonstration vehicle with a source of energy for said electrical power supply;

f) means for experimental operation of said electronic system; and g) means for experimental measurement of said design modifications of said passenger vehicle for a custom installation of said electronic system to serve said mobile vehicle passengers.

14. A portable demonstrating apparatus, as recited in claim 13, wherein said demonstration vehicle comprises:

a) A cabinet comprising:
an open space for temporarily holding a first set of electronic modules of said electronic system, during transit of said demonstration vehicle to said outside parking place where said first set of modules are placed in preferred locations with said customer's vehicle;

an enclosed compartment for installation therein of permanent electrical subsystems required for demonstrations of said electronic system; and means for roll-about portability of said cabinet, responsive to said attending salesperson;

b) at least one panel affixed to an cabinet for mounting thereon a second set of electronic modules of said electronic system during the interval of said demonstration;

c) said electrical power supply, permanently installed within said enclosed compartment, for operation of said electronic system, responsive to control by said attending salesperson;

d) a switching subsystem permanently installed for demonstration of performance and for said experimental specification of design modifications of said passenger vehicle to satisfy the customer's preferences, said switching subsystem responsive to attending salesperson; and e) a wiring harness for interconnection of said power supply, said switching subsystem, and said electronic system.

15. A portable demonstration apparatus, as recited in claim 14, further comprising:
a) louvers in at least one wall of said enclosed compartment for the intake of ambient air; and
b) an exhaust fan for discharge of interior air for regulating the internal temperature of said enclosed compartment.

16. A portable demonstration apparatus, as recited in claim 13, wherein said electrical power supply comprises:
a) a converter of 110-volt AC power to a 12-volt DC supply.

17. A portable demonstration apparatus, as recited in claim 13, wherein said means for supplying a source of energy comprises:
a) an electrical cable for connecting said demonstration vehicle to a nearby off-vehicle source of 110-volt AC electrical power.

* * * * *